United States Patent [19]

Keeton et al.

[11] 4,276,718
[45] Jul. 7, 1981

[54] HERBICIDE APPLICATION

[75] Inventors: John H. Keeton, Campbellsville; Lyle S. Keeton; Eugene G. Keeton, both of Trenton, all of Ky.

[73] Assignee: Keeton Enterprises, Inc., Campbellsville, Ky.

[21] Appl. No.: 101,567

[22] Filed: Dec. 10, 1979

[51] Int. Cl.³ .............................................. B05C 1/00
[52] U.S. Cl. ...................... 47/1.5; 401/126; 401/130; 401/131; 401/196; 401/207; 15/210 R
[58] Field of Search ................ 47/1, 1.5; 401/118, 401/119, 121-131; 206/209, 209.1; 15/104.93, 104.94, 257.06, 210 R

[56] References Cited

U.S. PATENT DOCUMENTS

| | | | |
|---|---|---|---|
| 1,633,433 | 6/1927 | Boyer et al. | 222/584 |
| 2,528,657 | 11/1950 | Whiting | 121/167 |
| 2,584,042 | 1/1952 | Ober | 206/209.1 |
| 2,696,696 | 12/1954 | Tigerman | 47/1 |
| 2,784,434 | 3/1957 | Little | 401/122 |
| 2,790,984 | 5/1957 | Gilfin | 401/130 X |
| 3,009,189 | 11/1961 | Pappas | 401/127 |
| 3,146,806 | 9/1964 | Ginsburg | 141/110 |
| 3,232,006 | 2/1966 | Atherton et al. | 47/1.5 |
| 3,246,657 | 4/1966 | Roller | 401/119 |
| 3,837,749 | 9/1974 | Spatz | 401/130 |
| 3,925,927 | 12/1975 | Linton | 47/1.5 |
| 3,951,157 | 4/1976 | Idec | 401/130 X |
| 4,126,962 | 11/1978 | Polcaro | 47/1.5 |
| 4,189,245 | 2/1980 | Bennett | 401/126 |

OTHER PUBLICATIONS

Sideswipe, The Ultimate Tool, Sideswipe Co. promotional paper.
Lightning Hoe, Hardy-Roberson Inc., Batesville, Miss.

Primary Examiner—Robert E. Bagwill
Attorney, Agent, or Firm—Cushman, Darby & Cushman

[57] ABSTRACT

A liquid applicator device and a method of utilization thereof to effect plant destruction. A first distinct container containing herbicide, with a rotary valve extending from one end thereof, is mounted on a second elongated container with the metering valve between the first and second containers. An elongated roller having a fibrous cover for receiving herbicide from the container and for ultimately transferring the herbicide to a plant is insertable into the second container, and has a handle extending from one end thereof outwardly of the second container. The opposite end of the roller is operatively connected to an actuator for the valve between the containers so that relative rotational movement between the roller and the containers results in metering of a predetermined amount of herbicide from the first container to the second container. In the second container the herbicide is evenly distributed over the surface of the fibrous covering, and after the predetermined amount has been metered the roller is withdrawn and the fibrous covering thereof touched to plants to effect destruction thereof. A telescopic rod operatively connects the roller handle to a support for the fibrous covering.

19 Claims, 4 Drawing Figures

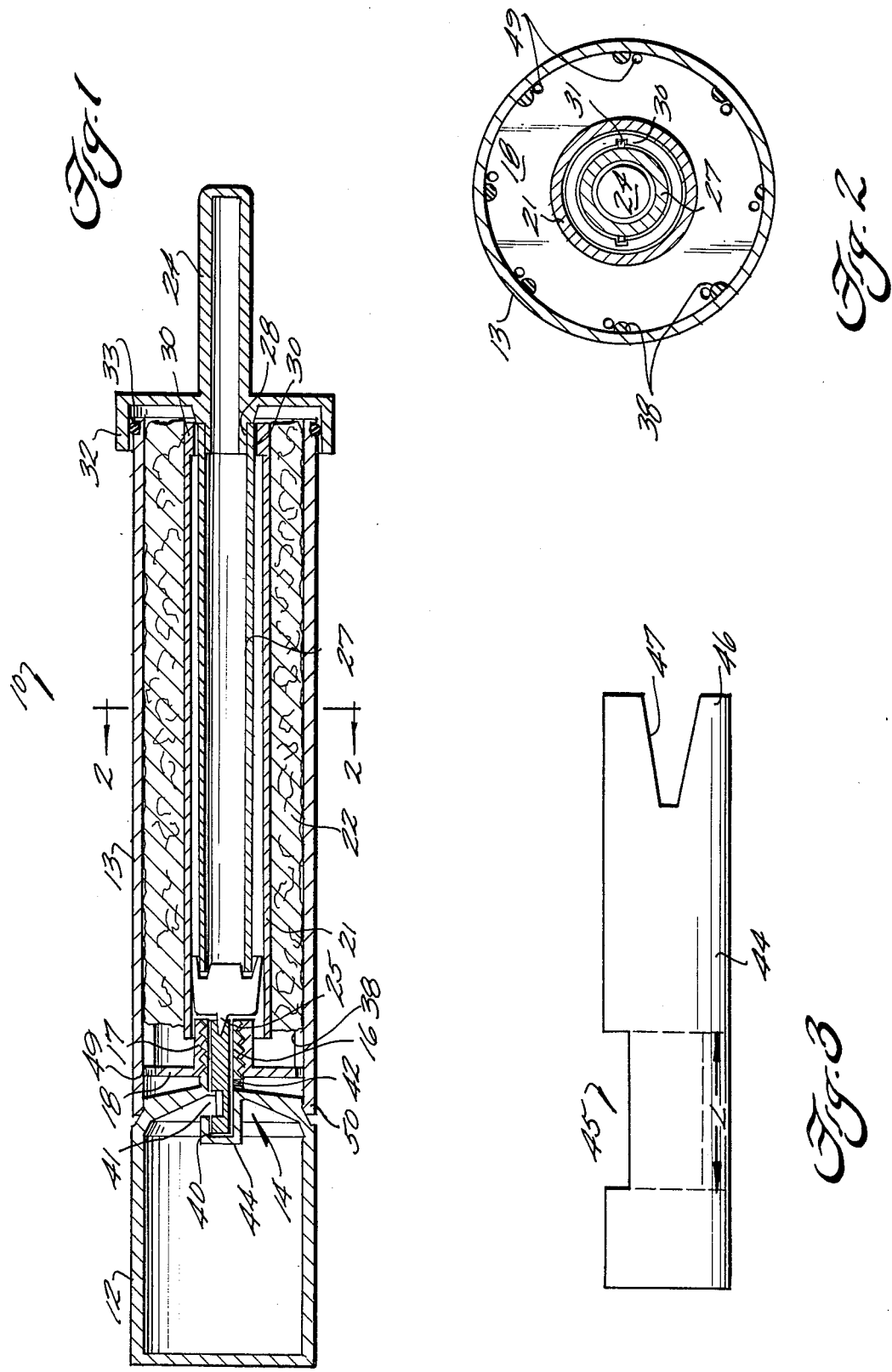

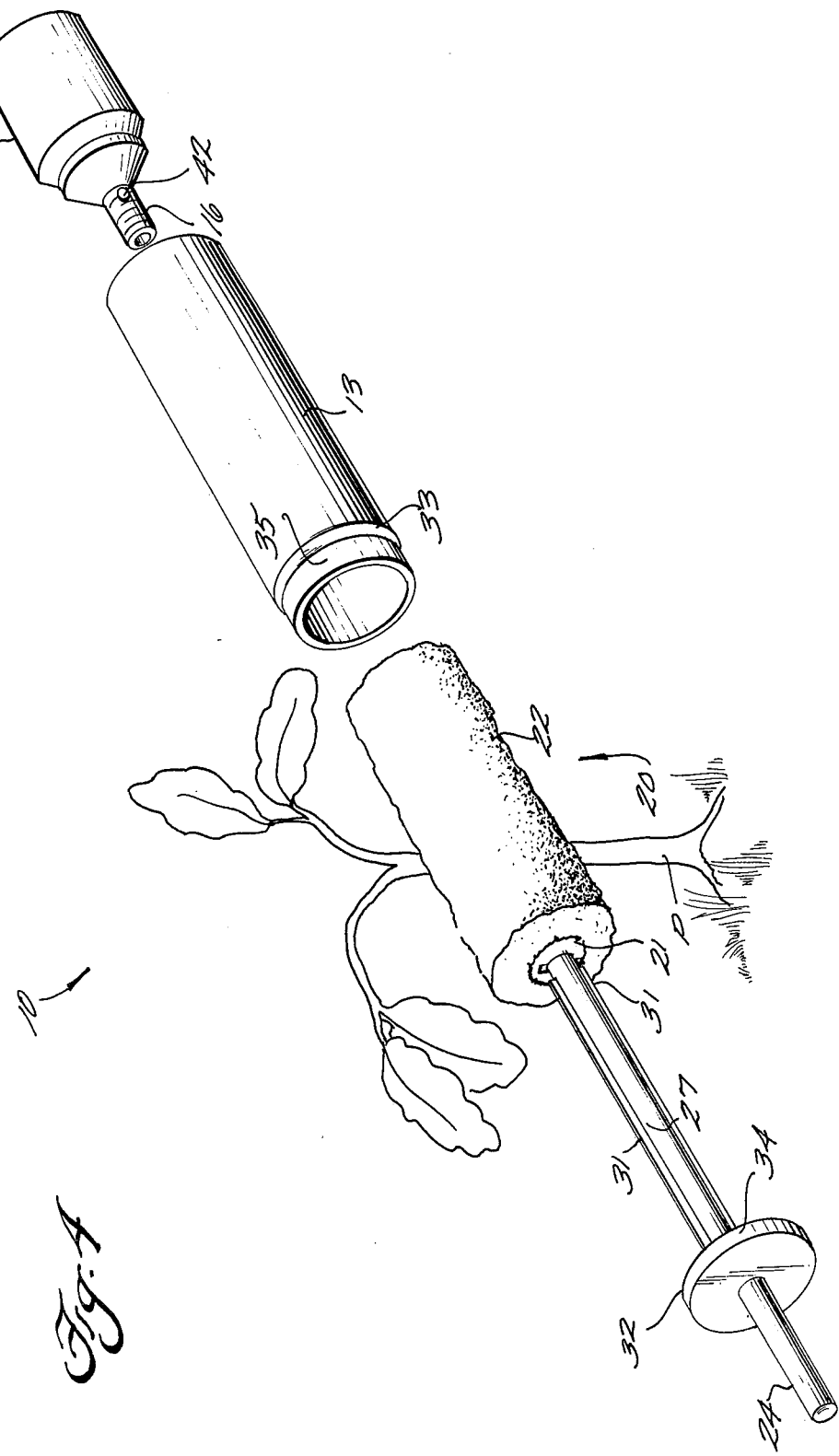

HERBICIDE APPLICATION

BACKGROUND AND SUMMARY OF THE INVENTION

There have been many proposals for the application of liquid contact herbicides to undesirable plants, especially in fields with growing crops and in gardens, to effect destruction of the unwanted plants while not harming the crop plants. Many contact herbicides that are applied, such as ROUNDUP, are extremely potent and effective, and expensive, so that it is desirable to apply only a predetermined small amount of herbicide to plants to be destroyed, and positively prevent application to the crop plants.

Typically, herbicide application in fields with growing plants have been accomplished utilizing recirculating sprayers or wick applicators. Recirculating sprayers do not lend themselves to small area applications, and are extremely complicated, and cannot be utilized effectively under all environmental and field conditions (e.g., when it is extremely windy). Wick applicators have met with a great deal of commercial success and are generally useful, however, they too do not lend themselves to small area applications, and additionally, there can be excessive loss of herbicide (e.g., ROUNDUP) due to evaporation while the applicator is in transit or between uses, and additionally the constantly exposed wick applicator can prevent certain health and safety problems.

According to the present invention, a method of herbicide application, and a particular liquid applicator device eminently suited for such herbicide application, are provided which eliminate many of the drawbacks present in prior art devices, and are especially suited for small area application. The liquid applicator device according to the present invention effectively dispenses a metered amount of herbicide onto plants that are desirably destroyed, and can readily be operated to be self-contained so that no significant evaporation loss of herbicide, and no significant adverse health and safety problems, are presented thereby. The invention facilitates simple yet effective destruction (i.e., killing or substantially reducing the competitive abilities of) undesired plants in fields and gardens where crops are growing.

According to the present invention, a liquid applicator device is provided that is eminently suited for herbicide application (although it may also have other uses). The liquid applicator device includes an elongated container having first and second portions separated by a metering valve, the first portion containing a supply of liquid (e.g., herbicide) and the second portion for receiving metered amounts of the liquid from the first portion. The device also includes an elongated roller having fibrous covering means for receiving liquid from the container and for ultimately transferring the liquid to another object, and having a cross-sectional area, including the covering means, smaller than the inside cross-sectional area of the container second portion. The roller includes a handle extending from one end thereof and valve operating means operatively connected to the other end thereof. The device further comprises a valve actuator means operatively associated with the valve disposed between the container first and second portions, for engagement with the valve operating means, so that movement of the roller relative to at least one portion of the container results in actuation of the valve to meter liquid from the first portion of the container to the second portion thereof.

Preferably the container first and second portions are separable distinct containers, each including means for releasably attaching it to the other container, so that the first container may be removed from the second container and replaced with a new liquid-filled other first container. The valve preferably is a rotary valve, and the roller is preferably a conventional paint roller only having a telescopic rod means interconnecting the handle and a support for the covering means. A number of wiping ridges may be provided on the interior of the second container to facilitate even distribution of the liquid onto the roller covering means.

The valve associated with the device according to the invention preferably comprises a valve housing connected to the first container, the valve housing having an inlet port disposed within the volume defined by the first container and an outlet port disposed on the opposite side of the inlet port, and exteriorly of the volume defined by the first container. The valve further comprises a valve element mounted for rotation in the valve housing, the valve element having a cavity with a predetermined volume formed therein, the cavity effectively extending a length at least as great the longitudinal distance between the inlet and outlet ports of the valve housing, and having a distal portion extending exteriorly of the first container and comprising the valve actuator means. The valve actuator means comprises a key cavity formed in the valve element, while the valve operating means comprises a key corresponding to the key cavity and extending from the roller.

According to the present invention a method of destroying plants is provided that utilizes the liquid applicator device described above. The method comprises the steps of: Effecting the relative movement between the roller and at least one of the first and second portions of the container, to meter a predetermined amount of herbicide from the container first portion to the container second portion, with the roller in place in the second portion to dispose herbicide on the roller covering means. Removing the roller, with herbicide thereon, from the container second portion. Touching the roller to plants that are desirably destroyed, so that herbicide is transferred from the roller to the plants to thereby result in destruction of the plants touched thereby. Reinserting the roller into the container second portion; and occasionally repeating the above steps until desired plant destruction is completed. Whenever the first container is emptied of herbicide, a full container is added. Since the containers are completely separate and distinct and are readily detachable from each other, there will be no significant amount of herbicide that will be wasted, the herbicide with which the device is utilized may be readily changed, and the rates of application of herbicide (metering) may be readily changed by providing different first containers having different valve actuators (for metering different amounts of liquid per activating movement). Preferably the metering of herbicide from one container to the other is accomplished by effecting relative rotational movement between the roller and the first and second containers, and preferably the metering valve is designed so that 360° relative rotation between the roller and the container must be effected a plurality of times to meter the predetermined amount of herbicide from the first container to the second container to facilitate practical practicing of the "touching" step.

It is the primary object of the present invention to provide a simple and effective liquid applicator device, and a method of utilization thereof for destroying plants. This and other objects of the invention will become clear from an inspection of the detailed description of the invention, and from the appended claims.

BRIEF DESCRIPTION OF THE DRAWINGS

FIG. 1 is a side view, partly in cross-section and partly in elevation, of an exemplary liquid applicator device according to the present invention;

FIG. 2 is a sectional view of the device of FIG. 1 taken along lines 2—2 of FIG. 1 with the fibrous cover of the roller omitted for clarity;

FIG. 3 is a detailed side view of the valve element of the device of FIG. 1; and FIG. 4 is an exploded perspective view of the device of FIG. 1.

DETAILED DESCRIPTION OF THE DRAWINGS

A liquid applicator device according to the present invention is illustrated generally at 10 in the drawings. The device 10 includes an elongated container having first and second portions 12, 13, respectively, separated by a metering valve illustrated generally at 14. Preferably the first and second portions are separable distinct containers, portion 12 being a first container and portion 13 being a second container. Means are provided for releasably attaching the two containers together so that the first container 12 may be removed from the second container and replaced with a new, liquid-filled other first container 12. Such releasably attaching means preferably comprises a projection 16 with exterior screw threads extending outwardly from the first container 12, and a bore 17 formed in a top 18 of the second container 13 and including interior threads corresponding to the exterior threads on the projection 16.

The device 10 further comprises an elongated roller, shown generally at 20. The elongated roller 20 preferably comprises a conventional paint roller or the like, and has a support 21 for a fibrous covering means 22. The fibers may be of any suitable conventional type, synthetic or natural, disposed in a suitable configuration. The roller further includes a handle 24 extending from one end thereof and valve operating means operatively connected to the other end thereof. The valve operating means preferably comprises a key projection 25 (see FIG. 1). The cross-sectional area of the roller, including the covering means 22, is smaller than the inside cross-sectional area of the container second portion 13, and preferably both such cross-sectional areas are circular. Preferably telescopic rod means 27 operatively interconnect the support 21 for the covering means 22, and the handle 24, with the key valve operating means 25 disposed on one end of the rod means 27, and the other end of the rod means 27 receiving an attaching portion 28 of the handle 24. Cooperating lugs are provided on the interior end of the support 21 (e.g., see lugs 30 in FIG. 1) closest to handle 24, and the portion of the rod means 27 receiving the handle portion 28 (e.g., see lugs 31 in FIG. 4), so that rotation of the handle 24 effects rotation of the entire roller 20.

The handle 24 further includes a peripheral flange portion 32 for operatively receiving the open end of the second container 13 therein. An O-ring 33, or like sealing means, is provided on the exterior of the second container 13 adjacent the open end thereof for preventing substantial liquid leakage out of the second container 13 past the handle 24 while still allowing relative rotation or movement between the handle 24 and the second container 13. Additionally, cooperating indicia 34, 35 (see FIG. 4) are preferably provided on the handle peripheral flange 32 and the exterior of the second container 13 to allow lining up of the roller 20 with the second container 13, and for indicating when a complete revolution (360°) of the handle 24 with respect to the second container 13 has been made.

As illustrated most clearly in FIG. 2, the second container 13 has wiping means associated therewith for facilitating even distribution of the liquid onto the roller covering means 22. The wiping means comprise a plurality of ridges 38 extending generally parallel to the direction of elongation of the second container 13 substantially the length thereof.

The device 10 further comprises a valve actuator means operatively associated with the valve 14, for engagement with the valve operating means (key 25), so that movement of the roller 20 relative to at least one of the containers 12, 13 results in actuation of the valve 14 to meter liquid from the first container 12 to the second container 13. The valve 14 preferably comprises a valve housing 40 (see FIG. 1) connected to the first container 12, the valve housing 40 having an inlet port 41 disposed within the volume defined by the first container 12, and an outlet port 42 disposed on the opposite side of the inlet port 41, and exteriorly of the volume defined by the first container 12. The valve 14 further comprises a valve element 44 (see FIGS. 1 and 3 in particular) rotatably mounted in the valve housing 40 and having a cavity 45 of a predetermined volume formed therein. The cavity extends at least a distance L (see FIG. 3) at least as great as the longitudinal distance between the inlet and outlet ports 41, 42 respectively of the valve housing 40. The valve element 44 further comprises a distal portion 46 extending exteriorly of the first container 12 and comprising the valve actuator means. Preferably, a key cavity 47 is formed in the distal portion 46 which has a configuration corresponding to the configuration of the key 25 of the valve operating means, the key cavity 47 comprising the valve actuator means. Relief parts prevents air lock of liquid in cavity 45.

The top 18 of the second container 13 has a central opening therein for receipt of at least a portion of the valve housing 40. As shown most clearly in FIG. 1, the central opening in the top 18 is the interiorly threaded opening 17, and the portion of the housing 40 received by the opening 17 is the exteriorly threaded portion 16 which effects releasable attachment between the containers 12, 13. The portions 17, 16 are so dimensioned that the outlet port 42 from the valve housing 40 is disposed "above" the second container top 18. The top 18 further comprises a plurality of openings 49 formed around a peripheral portion thereof and leading to the interior of the second container 13, so that liquid flowing through the valve housing outlet 42 is deposited on the second container top 18 and flows through the openings 49 into the interior of the container 13. The annular lip 50 of the second container 13 prevents fluid flow from 12 to 13 except through openings 49.

An exemplary liquid applicator device according to the present invention having been described, an exemplary method of destroying plants utilizing the device 10 will now be set forth. The method comprises generally the following steps: Effecting relative movement between the roller 20 and at least one of (preferably both) the first and second portions 12, 13 of the container, to meter a predetermined amount of herbicide from the container first portion 12 to the container second portion 13, with the roller 20 in place in the second portion 13 to dispose herbicide on the roller covering means 22 (see FIG. 1). Removing the roller 20, with herbicide thereon, from the container second portion 13 (see FIG. 4). Touching the roller covering means 22 to plants that are desirably destroyed so that herbicidie is transferred from the roller to the plant to thereby result in destruction of the plants touched thereby (such as touching plant P as illustrated in FIG. 4). Reinserting the roller 20 into the container second portion 13; and occasionally repeating the above steps until desired plant destruction is completed.

In more detail an exemplary method of utilizing the device 10 according to the present invention is as follows:

A cannister 12 filled with ROUNDUP, or other suitable herbicide, is mounted so that the exterior threaded portion 16 of the valve housing 40 is threadedly received by the interior central opening 17 of the top 18 of the second container 13, the annular lip 50 of the second container 13 ensuring that herbicide passing from container 12 to container 13 does not leak out therebetween. The device 10 is then oriented so that the continer 12 is above the container 13, and the roller 20 is inserted into the second container 13—to the position illustrated in FIG. 1—so that the peripheral flange 32 of the handle 24 of the roller receives the container 13, and seals with the O-ring 33, and the key 25 is received by the key cavity 47 of the valve element 44 distal portion 46.

To effect dispensing of a measured amount of herbicide from the first container 12 to the second container 13, the handle 24 is then grasped and rotated 360° (utilizing indicia 34, 35 for guides if desired) relative to the containers 12, 13. This rotation of the handle 24, acting through the lugs 30, 31, effects rotation of the entire roller 20, including covering means 22, with respect to the container 13. Due to the interengagement between the key 25 and key cavity 47, the valve element 44 is also rotated from the position illustrated in FIG. 1— wherein the inlet port 40 thereof is in communication with the herbicide within the volume defined by the container 12—to a position 180° therefrom wherein the cavity 45 of the valve element 44 is then in communication with the outlet port 42 in the housing 40, exterior of the first container 12. As a result of this relative rotation, the entire predetermined volume of the cavity 45 is deposited on top of the top 18 of the second container 13, and flows through openings 49 into the interior of the second container 13, with the relative rotation also causing the wiper ridges 38 to facilitate even distribution of the herbicide along the entire extent of the covering means 22. Preferably the cavity 45 is sized relative to the rest of the structures so that a plurality (e.g., 4 or 5) complete 360° rotations of the roller 20 with respect to the containers 12, 13 are necessary in order to deposite the desired amount of herbicide into the second container 13 for effective utilization of the roller 20 to destroy plants in a practical manner.

Once the predetermined amount of herbicide has been dispensed into the second container 13, and onto the roller covering means 22, the operator moves the handle 24 linearly with respect to the second container 13, causing first the telescopic rod means 27 to move with respect to the covering means support 21 so that the handle 24 is in a remote position from the covering means 22 (see FIG. 4), and then for the roller covering means 22 to be withdrawn from the second container 13 (again see FIG. 4). Then the covering means 22 is touched to a plant P (see FIG. 4), applying herbicide from the covering means 22 to the plant P, and resulting in destruction thereof. A number of plants can be touched with the roller 20, and after touching of a number of plants the roller 20 is reinserted into the open end of the second container 13, collapsing the telescopic rod means 27, until the roller 20 again assumes the position illustrated in FIG. 1. The metering of herbicide from the first container 12 to the second container 13 is then repeated as desired, as are the withdrawal and touching steps, until the desired area of growing crops has been treated to destroy undesired plants therein.

When the first container 12 is empty, it is merely unscrewed from connection with the second container 13, and replaced by a new, full, first container.

It will be seen that the device and method according to the present invention are extremely simple, yet are effective in metering a predetermined about of herbicide to an applicator device, and in effecting plant destruction utilizing the applicator. Since the entire device 10 in the closed position (FIG. 1) is self-contained, there is no evaporative loss of expensive herbicide, nor is any safety or health hazard presented thereby. The device 10 can be utilized with a wide variety of herbicides or other liquids, merely the substitution of one first container 12 for another (and perhaps cleaning of the roller covering 22) being necessary.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent devices and methods.

What is claimed is:

1. A liquid applicator device comprising an elongated container having first and second portions separated by a metering valve, said first portion containing a supply of liquid, and said second portion for receiving metered amounts of liquid from said first portion;

an elongated roller having fibrous covering means for receiving liquid from said container and for ultimately transferring the liquid to another object, and having a cross-sectional area, including said covering means, smaller than the inside cross-sectional area of said container second portion; said roller including a handle extending from one end thereof and valve operating means operatively connected to the other end thereof; and a valve actuator means operatively associated with said valve disposed between said container first and second portions, for engagement with said valve operating means, so that movement of said roller relative to at least one said portion of said container results in actuation of said valve to meter liquid from said first portion to said second portion.

2. A device as recited in claim 1 wherein said container first and second portions are separable distinct containers, each including means for releasably attaching it to the other container, so that said first container may be removed from said second container and replaced with a new, liquid-filled, other first container.

3. A device as recited in claim 2 wherein said second container has an interior that is circular in cross-section, and wherein said roller is circular in cross-section, and wherein said valve is a rotary valve, said valve actuating means rotating to meter amounts of liquid to said second container from said first container.

4. A device as recited in claim 3 wherein relative rotation of said roller with respect to both said first and second containers effects actuation of said valve, and wherein said second container interior includes a plurality of wiping means for facilitating even distribution of the liquid onto the roller covering means.

5. A device as recited in claim 4 wherein said wiping means comprises a plurality of ridges extending generally parallel to the direction of elongation of said second container substantially the length thereof.

6. A device as recited in claim 3 wherein said valve comprises (a) a valve housing connected to said first container, said valve housing having an inlet port disposed within the volume defined by said first container, and an outlet port disposed on the opposite side of said inlet port, and exteriorly of the volume defined by said first container; and (b) a valve element mounted for rotation in said valve housing, said valve element having a cavity having a predetermined volume formed therein, said cavity extending a length at least as great as the longitudinal distance between said inlet and outlet ports of said valve housing, and having a distal portion extending exteriorly of said first container and comprising said valve actuator means.

7. A device as recited in claim 6 wherein said valve actuator means comprises a key cavity formed in said valve element, and wherein said valve operating means comprises a key corresponding to said key cavity, and extending from said roller.

8. A device as recited in claim 6 wherein said second container comprises a top, said top having a central opening therein for receipt of at least a portion of said valve housing and said distal portion of said valve element; and said top including a plurality of openings formed around a peripheral portion thereof and leading to the interior of said second container; and wherein said means for releasably attaching said containers together comprises means for attaching said containers so that said outlet port from said valve housing is disposed above said second container top so that liquid flowing through said valve housing outlet is deposited on said second container top and flows through said openings formed in a peripheral portion of said top into the interior of said second container.

9. A device as recited in claim 1 wherein said roller includes telescopic rod means operatively interconnecting a support for said covering means and said handle; and wherein said handle includes a peripheral flange portion for operatively receiving said second container therein; and further comprising sealing means for preventing substantial liquid leakage out of said second container past said handle, while still allowing relative rotational movement between said handle and said second container.

10. A device as recited in claim 9 wherein said valve actuator means comprises a key cavity formed in a rotary valve element, and wherein said valve operating means comprises a key portion, for cooperation with said key cavity, extending outwardly from said telescopic rod means for engaging said key cavity when said telescopic rod means is in the collapsed position with said handle peripheral flange receiving said second container.

11. A method of destroying plants utilizing a liquid applicator device including an elongated container having first and second portions separated by a metering valve, the first portion containing a supply of liquid herbicide, and the second portion for receiving metered amounts of herbicide from the first portion; an elongated roller having a fibrous covering means for receiving herbicide from the container, the roller having a cross-sectional area—including the covering means—smaller than the inside cross-sectional area of the container second portion, the roller further including a handle extending from one end thereof and valve operating means operatively connected to the other end thereof; and a valve actuator means operatively associated with the valve and for engagement with the valve operating means so that movement of the roller relative to at least one of the first and second portions of the container results in actuation of the valve to meter liquid from the first portion to the second portion; said method comprising the steps of (a) effecting relative movement between the roller and at least one of the first and second portions of the container, to meter a predetermined amount of herbicide from the container first portion to the container second portion, with the roller in place in the second portion to dispose herbicide on the roller covering means;

(b) removing the roller, with herbicide thereon, from the container second portion;

(c) touching the roller covering means to plants that are desirably destroyed, so that herbicide is transferred from the roller to the plants to thereby result in destruction of the plants touched thereby;

(d) reinserting the roller into the container second portion; and (e) occasionally repeating steps (a)–(d) until desired plant destruction is completed.

12. A method as recited in claim 11 wherein the first and second portions of the container are separable distinct containers, and comprising the further steps of: detaching the first container from the second container when it is emptied of herbicide; and attaching a new, full, first container to the second container.

13. A method as recited in claim 11 wherein step (a) is accomplished by effecting relative rotational movement between the roller, including the handle thereof, and both the first and second containers.

14. A method as recited in claim 13 wherein step (a) is further accomplished by effecting 360° relative rotation between the roller and the container first and second portions a plurality of times to meter the predetermined amount of herbicide from the first container to the second container to facilitate practical practicing of step (c).

15. A method as recited in claim 13 wherein the roller handle is operatively connected to a support for the covering means by telescopic rod means; and wherein step (b) is practiced by effecting telescopic movement of the handle with respect to the second container portion so that the handle is remote from the roller covering means; and wherein step (d) is practiced by effecting collapsing telescopic movement between the handle and the support for the roller covering means.

16. A method as recited in claim 12 wherein steps (a)–(d) are practiced by orienting the device so that the first container is located vertically above the second container.

17. A method of destroying plants utilizing a portable liquid applicator device including a container having a first, closed end, and a second end with an opening therein; a structure with a fibrous exterior for holding liquid herbicide insertable into and withdrawable from the container through the opening in the container second end, and having a handle; and a closure structure operatively associated with the handle for closing the opening in the container second end when the structure with fibrous exterior is disposed within the container; said method comprising the steps of:

(a) disposing liquid contact herbicide within the container so that it is partially filled with liquid;

(b) inserting the structure with fibrous exterior through the opening in the container second end until the closure structure generally closes the opening, with the handle sticking outwardly from the container so that it never touches the herbicide;

(c) removing the structure with fibrous exterior, with herbicide held thereby, from the container by pulling on the handle and withdrawing the structure through the container second end opening;

(d) touching the structure fibrous exterior to plants that are to be desirably destroyed, so that herbicide is transferred from the structure to the plants to thereby result in destruction of the plants touched thereby; and (e) occasionally repeating steps (b)-(d), if necessary, until desired plant destruction is completed, or until step (a) must be repeated.

18. A portable liquid applicator comprising a container elongated along an axis and having a first, closed end, and a second end including means defining an opening therein;

a roller elongated along an axis and having fibrous covering means for receiving liquid from said container and for ultimately transferring the liquid to another object, and having a cross-sectional area, including said covering means, smaller than the inside cross-sectional area of said container and than said said opening in said container second end; said roller including a handle extending from one end thereof; and means operatively associated with said roller handle for closing and sealing said opening in said container second end when said roller is in said container.

19. A device as recited in claim 18 further comprising means mounted within said container for effecting generally even distribution of liquid within said container onto said roller fibrous covering means.

* * * * *